Dec. 16, 1969     E. F. HINDERER     3,483,733
VALVE FOR LEAK TESTING SYSTEM
Filed Oct. 20, 1967
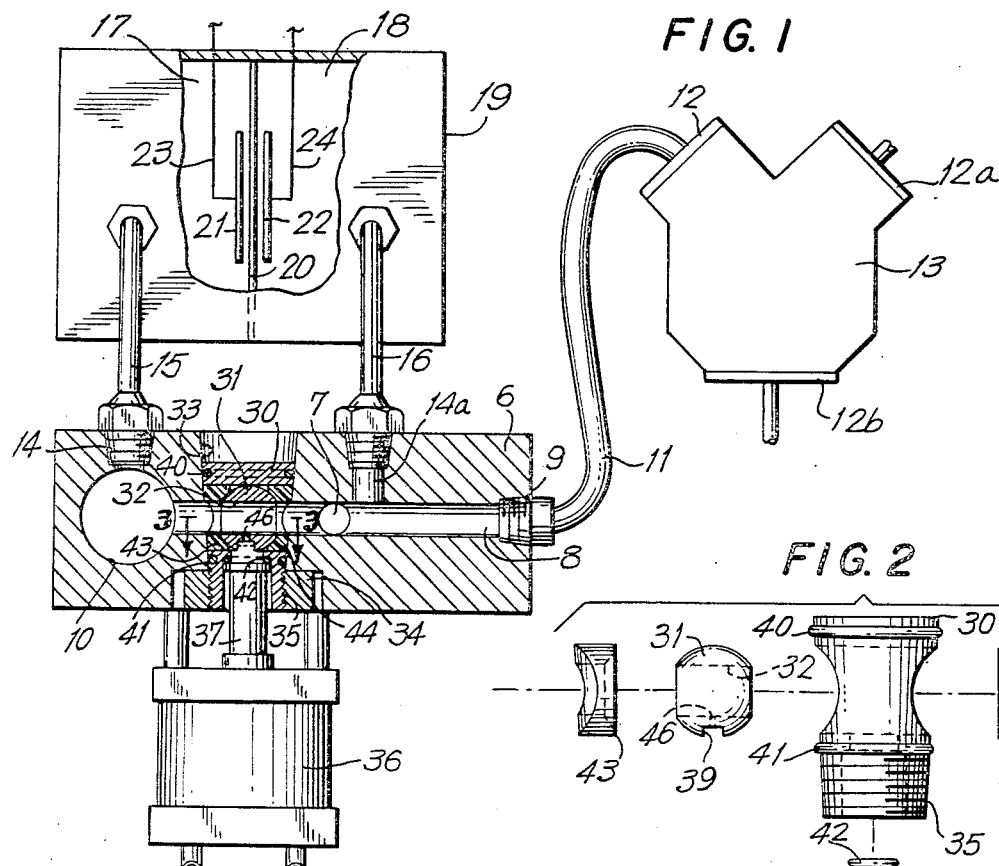
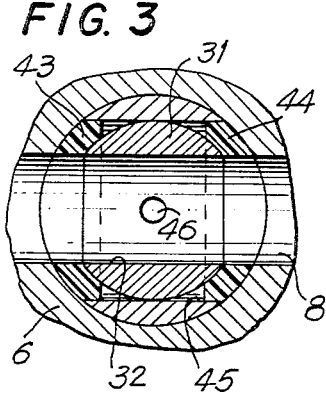
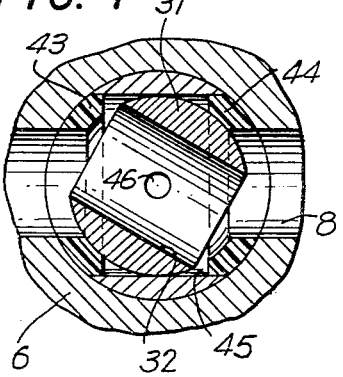
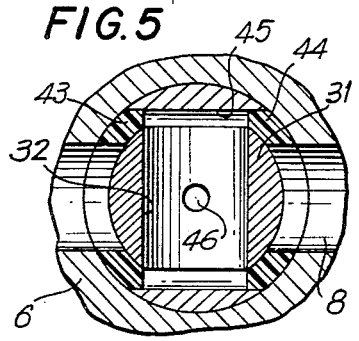
INVENTOR
EDWARD F. HINDERER
BY
Curtis, Morris + Safford
ATTORNEYS United States Patent Office 3,483,733
Patented Dec. 16, 1969

3,483,733
VALVE FOR LEAK TESTING SYSTEM
Edward F. Hinderer, Royal Oak, Mich., assignor to Ajem Laboratories Inc., Livonia, Mich.
Filed Oct. 20, 1967, Ser. No. 676,898
Int. Cl. G01m 3/04; F16k 1/22
U.S. Cl. 73—40                                     4 Claims

ABSTRACT OF THE DISCLOSURE

Improvements in ball type valves used in leak testing systems of the type which is located in a conduit with sealing rings on each side and having a central opening for alignment with passages in the conduit, and specifically relates to venting the interior chamber formed by said hole to the space between its periphery and the sealing ring to avoid false readings due to release of pressure at the periphery after a period of idleness or pressure change.

---

The present invention relates to controlling the flow of fluids through conduits and more particularly to an improved valve construction for a leak testing system.

The present invention is shown applied to a leak testing system of the kind described and claimed in United States Letter Patent issued to Richard Thomas Fitzpatrick et al., No. 3,326,034 issued July 20, 1967. The improved leak testing system disclosed in said patent has a metal manifold block with passages therein through which a testing fluid is supplied, and valves located in the passages to control the flow of fluids. To avoid variations in pressure resulting from the sudden closing of a poppet valve, a rotary valve is provided having an opening therethrough which simultaneously cuts off the inlet to and outlet from the valve as it is turned to close positions. As illustrated, the movable valve element may take the form of a ball having sealing rings at its opposite sides.

The leak testing system described and claimed in the Fitzpatrick patent is much more sensitive, responsible and reliable in operation than the prior art leak testing systems previously used. However, it was found that the first test of the patented leak testing system after an idle period, or pressure change, was apt to give a false indication of a leak condition. Thus, it became the usual practice to disregard the results of such first tests after a period of idleness, or pressure change, and to repeat the test which thereafter would be accurate.

One of the objects of the present invention is to provide an improved valve construction for controlling the flow of fluid through conduits which avoids any popping effect after a period of idleness or pressure change.

Another object is to provide an improved valve construction for use in a leak testing system which eliminates any inaccuracies which are apt to occur after a period of idleness or pressure change.

Still another object is to provide an improved valve construction for use in leak testing apparatus which is of simple and compact construction, economical to manufacture and one which is reliable in operation.

These and other objects will become more apparent from the following description and drawing in which like characters denote like parts throughout the several views. It is expressively understood, however, that the drawing is for the purpose of illustration only and is not a definition of the limits of the invention, reference being had for this purpose to the appended claims.

In the drawing:

FIGURE 1 is a plan view, partly in section, of a manifold block in a leak testing system incorporating the improved valve construction of the present invention and showing the construction for equalizing the pressure at the interior and exterior of the moveable element in said valve;

FIGURE 2 is an exploded view of the improved valve construction to show the parts in extended relation;

FIGURE 3 is a sectional view taken on line 3—3 of FIGURE 1 and showing the moveable valve element in one position with the openings therein aligned with the conduit and extending to its outer periphery, respectively;

FIGURE 4 is a view similar to FIGURE 3 showing the moveable valve element rotated to a position where the central opening simultaneously connects the conduit with the peripheral space between the sealing rings; and FIGURE 5 is a view similar to FIGURES 3 and 4 showing the moveable valve element turned 90 degrees from the position illustrated in FIGURE 3 to shut off the flow of fluid through the conduit.

In general, the invention is directed to the discovery of the cause of certain false readings in a leak testing system and a change in construction to prevent such errors. It was known that when a leak testing system of the type described and claimed in the Fitzpatrick et al. Patent No. 3,326,034 was first operated after a period of idleness, it was apt to indicate a leak when, in fact, no leak actually existed. However, when the test was repeated and in all subsequent tests a leak or no leak would always be accurately indicated. As a result, it became the practice to always disregard the first test after a period of idleness.

It was discovered after long and careful studies of the condition that the cause of such inaccuracies was due to the escape of testing fluid under pressure from the supply conduit to the space surrounding the movable element of the divide valve between the sealing rings as the valve was moved toward a closing position to seal off the two parts of the system. This space at the periphery of the valve added an additional increment of volume to the space at one side of the divide valve and also produced surging of the fluid during the test. After ascertaining the cause of the inaccuracy, it was then further discovered that false readings during a first test could be avoided by providing a second opening in the valve for connecting the interior and exterior of the valve element. Testing fluid supplied to the conduit would then flow through the second opening to equalize the pressure at the interior and exterior of the moveable valve element and cause the pressure of the testing fluid to become stabilized on both sides of the divide valve before it closes. It was found that this difference in structure completely corrected the errors that had previously occurred and to accurately indicate a leak or no-leak condition during the first test as well as those occurring during subsequent tests.

Referring now to the drawing, the improved valve construction of the present invention is shown as a divide valve in the manifold block of a leak testing system, as described and claimed in said Fitzpatrick et al. Patent No. 3,326,034, referred to above. Said leak testing system comprises three valves for filling, dumping, and dividing the test cells of a measuring instrument, and it will be understood that the invention would be applied to each of the valves and actually, can be applied to any other system whereas sudden initial change in pressure, however, small, is undesirable.

As shown in the drawing, the leak testing system comprises a manifold block 6 having a longitudinally extending passage 7 through which testing fluid is supplied. A transverse passage 8 in said manifold block 6 is connected to passage 7 and terminates at one end in a port 9 at the right hand side of the block as viewed in FIGURE 1, and in a ballast chamber 10 having a particular volume at its opposite end. The outlet port 9 is connected by a flexible detachable hose connection 11 to a closure 12 for closing an opening in a part to be tested, such as an engine block 13. In addition to the closure 12 other closures 12a and 12b are provided for forming a closed cavity at the interior of the part. Branch conduits 14 and 14a extend from the transverse conduit 8 to the rearward side of the manifold block 6 and the branches are connected by a conduits 15 and 16 to the separate cells 17 and 18 of a measuring instrument 19. The separate cells 17 and 18 of the measuring instrument 19 are formed by a flexible diaphragm 20 therebetween which moves to the right or left upon the occurrence of the difference in pressure of the cells. Positioned at opposite sides of the diaphragm 20 are electrical plates 21 and 22 which together with the diaphragm constitute variable condensers. The condenser plates 21 and 22, in turn, are connected through conductors 23 and 24 to the sensing branch of the electric control circuit (not shown) of the leak testing system described in detail in the Fitzpatrick et al. patent, referred to above, and incorporated herein by reference thereto.

A divide valve 30 extends through the manifold block 6 and has a moveable valve element 31 with a central opening 32 extending therethrough in alignment with conduit passage 8. The valve 30 has a tapered housing 33 which fits in a correspondingly shaped opening through the manifold block 6 and is attached thereto by means of a nut 34 screwed onto the depending threaded end 35 of the housing. An actuator 36 has a stem 37 provided with a key 38 at its upper end for engaging a slot 39 in the moveable valve element 31 to turn the latter from the position shown in FIGURES 1 and 3 to a position at right angles thereto as shown in FIGURE 5. O-rings 40 and 41 are provided between the housing 33 and manifold block 6 at opposite sides of the valve element 31 and an O-ring 42 is provided between the stem 37 and housing to seal the joints therebetween. In addition, sealing rings 43 and 44 are provided in the housing 33 which engage the moveable valve element 32 at opposite sides thereof.

To perform a testing operation, the closures 12, 12a and 12b are closed to form a cavity at the interior of the part 13 being tested. A testing fluid at a predetermined pressure then is supplied through the conduit passages 7 and 8 in the manifold block 6 and into the ballast chamber 10 and cavity in the part being tested. At the same time, test fluid passes through the conduits 15 and 16 into the cells 17 and 18 at opposite sides of the diaphragm 20 in the measuring instrument 19. After the pressure has become stabilized in the cells 17 and 18 of the measuring instrument 19, ballast chamber 10 and cavity in the part 13, the divide valve 30 is operated to close the transverse passage 8 between the branch conduits 15 and 16 to thereby connect the ballast chamber 10 and cell 17 at one side and the cell 18 and cavity in the part 13 to be tested at the other side. If no leak exists in the part 13 tested, the pressure will remain constant on opposite sides of the diaphragm 20 to maintain the same potential charge on the capacitor plates 21 and 22. On the other hand, if a leak does exist in the part 13 being tested, the pressure in the cell 18 of the measuring instrument 19 becomes less than the pressure in the cell 17 causing movement of the flexible diaphragm 20 and thereby producing a different capacitance between the diaphragm and plates 21 and 22, respectively. This difference in capacitance is then applied to a sensing circuit which indicates that a leak exists in the part 13 tested. As thus far described, the testing system is substantially identical with that described and claimed in the Fitzpatrick Patent No. 3,326,034 referred to above.

In accordance with the present invention the rotary valve 30 is so constructed as to equalize the pressure in the opening 32 at the interior of the moveable valve element 30 and the space 45 at the outer periphery of the valve element between the sealing rings 43 and 44. To this end, the moveable valve element 31 is provided with a second opening 46 extending from the first opening 32 to the outer periphery of the valve element. In the illustrated embodiment wherein the moveable valve element 31 is spherical, the second opening 46 is in the form of a hole drilled radially inward from its outer periphery to the center thereof.

The leak testing system incorporating the improved valve construction of the present invention operates in substantially the same way as the prior leak testing system disclosed in the Fitzpatrick patent, except that when testing fluid under pressure is supplied through the main and transverse conduits 7 and 8, it flows radially outward through the second opening 46 to the space 45 at the outer periphery of the valve element as well as to the interior of the first passage 32. Thus, when the valve element 31 is moved from the position shown in FIGURE 3 to that shown in FIGURE 4 there will be no sudden change in pressure or surge of testing fluid when the pressure in the conduit 8 is connected to the space 45 as the valve element is turned. Such a sudden change in pressure and surging of the testing fluid had therefore been apt to give a false reading. After the pressure in the interior and exterior of the moveable valve element 32 has become equalized, no further change in pressure or surging will result. With the equalized pressure resulting from the construction of the valve element 32 of the present invention, the pressure is immediately equalized in the interior and exterior of moveable valve element and the first test will give an accurate indication of a leak or no-leak condition as well as subsequent tests.

It will now be observed that the present invention provides an improved valve construction for eliminating sudden changes in pressure or surging of a fluid passing therethrough. It will be further observed that the present invention eliminates inaccuracies which are apt to occur in a leak testing apparatus after a period of idleness. It will still further be observed that the present invention provides an improved valve construction for use in leak testing apparatus which is of simple and compact construction, economical to manufacture and one which is reliable in operation.

While a single embodiment of the invention is herein illustrated and described, it will be understood that changes may be made in the construction and arrangement of the elements without departing from the spirit or scope of the invention.

What is claimed is:

1. A leak testing apparatus for testing parts having a chamber formed on a wall thereof comprising a standard chamber, a differential pressure measuring instrument having separate cells and a pressure responsive means connected to said cells for measuring any difference in pressure in said cells, a conduit system for delivering testing fluid under pressure to the separate cells of said differential pressure measuring instrument, the chamber on the wall of the part being tested and the standard chamber, a divide valve in a portion of the conduit system connecting said separate cells of said differential pressure measuring instrument for separating the standard chamber and one cell from the chamber formed on the part being tested and the other cell, respectively, when the valve is closed, said divide valve comprising a rotatable element having a central opening for alinement with the interior of said portion of the conduit system connecting said separate cells of said differential pressure measuring instrument in one position and across said interior thereof in another position, sealing rngs engaging said rotatable divide valve element at different locations along the interior of said conduit portion and forming a space between said sealing rings at the exterior of said valve element and an actuator between said sealing rings and connected to turn said valve element, that improvement comprising means for avoiding false readings when said apparatus is first initiated after an idle period by turning said divide valve to close the portion of the conduit system between said separate cells of said measuring instrument, and said means including a second opening in said divide valve extending from the central opening into said space between said sealing rings to at all times equalize the pressure in said central opening at the interior of said valve and said space between said rings at the exterior of said valve.

2. Apparatus for testing parts for leaks in accordance with claim 1 in which said conduit system comprises passages in a metal manifold block, said divide valve having a housing extending into said block and having an opening in alinement with a passage of said conduit system connecting said separate cells of said measuring instrument, said rotatable valve element having a central opening comprising a ball, said sealing rings being mounted in said opening in said valve housing and engaging opposite side of said ball valve element, and said second opening in said valve ball extending radially from said central opening to its outer periphery.

3. Apparatus for testing parts for leaks in accordance with claim 2 in which the valve housing is tapered and mounted in a correspondingly shaped opening in said manifold block. O-rings between the valve housing and manifold block at opposite sides of said movable valve ball, said actuator for rotating the valve all extending through the manifold block, and an O-ring between the actuator and valve housing.

4. Apparatus for testing parts for leaks in accordance with claim 1 in which said conduit system for supplying testing fluid comprises passages in a metal manifold block, said standard chamber being formed in said block, one passage extending inwardly from one side of said block and terminating at its inner end in said standard chamber, means connecting the outer end of said one passage to the chamber on the wall of the part to be tested, passages extending from the first mentioned passage to another side of said block at opposite sides of said rotatable valve element, each of said last mentioned passages being connected to one of said cells of said differential pressure measuring instrument, respectively, and a diaphragm between said separate cells of said differential pressure measuring instrument which is flexed by any difference in pressure in said cells, whereby to separate the standard chamber and one cell from the chamber on the part and other cell.

References Cited

UNITED STATES PATENTS

| | | | |
|---|---|---|---|
| 3,164,169 | 1/1965 | Pareto | 251—315 XR |
| 3,270,772 | 9/1966 | Rakus | 251—315 XR |
| 3,326,034 | 6/1967 | Fitzpatrick et al. | 73—40 |
| 3,333,813 | 8/1967 | Rabe | 251—315 XR |

LOUIS R. PRINCE, Primary Examiner

JEFFREY NOLTON, Assistant Examiner

U.S. Cl. X.R.

251—315